(12) United States Patent
Masuda

(10) Patent No.: US 8,206,518 B2
(45) Date of Patent: Jun. 26, 2012

(54) DIE FOR PRESS FORMING OF GLASS AND MANUFACTURING METHOD THEREOF

(75) Inventor: Jun Masuda, Mishima (JP)

(73) Assignee: Toshiba Kakai Kabushiki Kaisha, Tokyo (JP)

( * ) Notice: Subject to any disclaimer, the term of this patent is extended or adjusted under 35 U.S.C. 154(b) by 252 days.

(21) Appl. No.: 11/573,501

(22) PCT Filed: May 11, 2006

(86) PCT No.: PCT/JP2006/309478
§ 371 (c)(1),
(2), (4) Date: Feb. 9, 2007

(87) PCT Pub. No.: WO2006/137225
PCT Pub. Date: Dec. 28, 2006

(65) Prior Publication Data
US 2009/0178737 A1    Jul. 16, 2009

(30) Foreign Application Priority Data
Jun. 24, 2005  (JP) ................................. 2005-185052

(51) Int. Cl.
*C21D 1/00* (2006.01)
*C22C 38/18* (2006.01)
(52) U.S. Cl. ........................................ 148/537; 148/333
(58) Field of Classification Search .................. 148/333, 148/537; C03B 11/00
See application file for complete search history.

(56) References Cited

U.S. PATENT DOCUMENTS

| 5,628,807 | A | 5/1997 | Yoshitake et al. |
| 5,964,398 | A * | 10/1999 | Kohno et al. ................. 228/194 |
| 7,377,477 | B2 | 5/2008 | Lucek et al. |
| 2004/0211222 | A1 | 10/2004 | Hosoe |
| 2005/0223742 | A1 | 10/2005 | Pai |

(Continued)

FOREIGN PATENT DOCUMENTS

CN    1126703    7/1996

(Continued)

OTHER PUBLICATIONS

ASM Handbook. Vo. 4, Heat Treating. "Carbon Content". Revised by Michael Wisti and Mandar Hingwe, Atmosphere Annealing, Inc. 1991.*

(Continued)

*Primary Examiner* — Jessica L Ward
*Assistant Examiner* — Alexander Polyansky
(74) *Attorney, Agent, or Firm* — DLA Piper LLP (US)

(57) ABSTRACT

The present invention is directed to provide a method for manufacturing a die for press forming of glass in which cracks are not easily caused in a surface covering layer. A surface covering layer made of an amorphous Ni—P alloy is formed on the surface of a base material made of a steel having a martensitic structure or made of steel in which ϵ-carbide is dispersed in low carbon martensite matrix. Then, the base material and the surface covering layer are heated to change the base material into a troostitic structure or a sorbitic structure and change the surface covering layer into a eutectic structure of Ni and $Ni_3P$. Preferably, the base material contains 0.3 wt % or more and 2.7 wt % or less of carbon and 13 wt % or less of chromium, and the heat treatment is carried out at 270° C. or more.

9 Claims, 1 Drawing Sheet

U.S. PATENT DOCUMENTS

| | | | |
|---|---|---|---|
| 2006/0222423 | A1 | 10/2006 | Dejong et al. |
| 2009/0178737 | A1 | 7/2009 | Masuda |
| 2009/0236016 | A1 | 9/2009 | Masuda et al. |
| 2010/0011815 | A1 | 1/2010 | Masuda et al. |

FOREIGN PATENT DOCUMENTS

| | | |
|---|---|---|
| CN | 1149322 | 5/1997 |
| CN | 1847178 | 10/2006 |
| EP | 1061051 | 12/2000 |
| EP | 1894895 | 3/2008 |
| JP | S49-51112 | 5/1974 |
| JP | 51-109224 A | 9/1976 |
| JP | 56-005956 | 1/1981 |
| JP | 56-141922 A | 11/1981 |
| JP | S60-114516 | 6/1985 |
| JP | 64-056826 | 3/1989 |
| JP | 01-129929 | 5/1989 |
| JP | 03-90539 A | 4/1991 |
| JP | 05-156350 A | 6/1993 |
| JP | 07-053233 | 2/1995 |
| JP | 07053233 A * | 2/1995 |
| JP | 08-143320 | 6/1996 |
| JP | 08-188441 | 7/1996 |
| JP | 09-020982 | 1/1997 |
| JP | 09-295818 | 11/1997 |
| JP | 10-8198 | 1/1998 |
| JP | 10-500735 A | 1/1998 |
| JP | 11-157852 A | 6/1999 |
| JP | 11-268921 | 10/1999 |
| JP | 11-335783 * | 12/1999 |
| JP | 11-335783 A | 12/1999 |
| JP | 2001-302260 | 10/2001 |
| JP | 2002-029772 | 1/2002 |
| JP | 2002-060239 | 2/2002 |
| JP | 2002-348129 | 12/2002 |
| JP | 2003-048723 | 2/2003 |
| JP | 2003-073134 | 3/2003 |
| JP | 2003-277078 | 10/2003 |
| JP | 2004-059368 | 2/2004 |
| JP | 2004-211132 | 7/2004 |
| JP | 2005-336553 | 12/2005 |
| JP | 2006-290700 | 10/2006 |
| JP | 2007/001822 | 1/2007 |
| JP | 2008-169107 | 7/2008 |
| TW | I316925 | 6/1995 |
| WO | WO-00/40516 | 7/2000 |
| WO | WO 2006-137225 | 12/2006 |
| WO | WO 2008-072664 | 6/2008 |
| WO | WO 2008-072665 | 6/2008 |

OTHER PUBLICATIONS

ASM Handbook. vol. 4, Heat Treating. "Alloy Content". Revised by Michael Wisti and Mandar Hingwe, Atmosphere Annealing, Inc. 1991.*

M-W Online. die. Jul. 31, 2009. <http://www.merriam-webster.com/dictionary/die>.*

English Translation of International Preliminary Report on Patentability, mailed Jan. 10, 2008.

Supplementary European Search Report mailed in corresponding application EP 06746287 dated Jan. 30, 2009.

Abdel-Hady, E. E.: "Study of microstructural defects in steel using positron annihilation lifetime technique," Nuclear Instruments & Methods in Physics Research, Section B: Beam Interactions with Materials and Atoms, Elsevier, Amsterdam, NL, vol. 221, Jul. 1, 2004, pp. 225-229, XP004510654.

Ohmori, Y.; Sugisawa, S.: "The Precipitation of Carbides during Tempering of High Carbon Martensite," Trans. JIM, vol. 12, 1971, pp. 170-178, XP002506985.

Agarewala R.C. et al.: "Electroless Alloy/Composite Coatings: A Review," Sadhana, Indian Academy of Sciences, Bangalore, IN, vol. 28, No. 3/4, Jan. 1, 2003, pp. 475-493, XP002450878, ISSN: 0256-2499.

Balaraju J. N. et al.: "Electroless NL-P Composite Coatings," Journal of Applied Electrochemistry, Springer, Dordrecht, NL, vol. 33, No. 9, Sep. 1, 2003, pp. 807-816, XP001220875, ISSN: 0021-891X.

Zhang, Y.Z.; Wu, Y.Y.; Yao, M.: "Fatigue properties of electroless deposited steel," Journal of Materials Sciences Letters, vol. 15, 1996, pp. 1364-1366, XP002507041.

International Search Report of PCT/JP2007/073955, pubished Mar. 11, 2008.

English Abstract of JP 05-156350 published Jun. 22, 1993.
Machine English Translation of JP 05-15650 published Jun. 22, 1993.
English Abstract of JP 11-335783 published Dec. 7, 1999.
Machine English Translation of JP 11-335783 published Dec. 7, 1999.
English Abstract of JP 11-157852 published Jun. 15, 1999.
Machine English Translation of JP 11-157852 published Jun. 15, 1999.
English Abstract of JP 08-188441 published Jul. 26, 1996.
Machine English Translation of JP 08-188441 published Jul. 26, 1996.
English Abstract of JP S60-114516 published Jun. 21, 1985.
English Abstract of JP 09-295818 published Nov. 18, 1997.
Machine English Translation of JP 09-295818 published Nov. 18, 1997.
English Abstract of WO 2006-137225 published Dec. 28, 2006.
English Language Translation of International Preliminary Report of Patentability (IPRP) issued Jun. 25, 2009 in PCT/JP2007/073955.
English abstract of JP-2008-169107 published Jul. 24, 2008.
Machine translation of JP-2008-169107 published Jul. 24, 2008.
International Search Report of PCT/JP2007/073956 issued Mar. 11, 2008.
International Preliminary Report on Patentability issued Jun. 25, 2009 on PCT/JP2007/073956.
English abstract of JP-2007-001822 published Jan. 11, 2007.
English Abstract of CN 1126703 published Jul. 17, 1996.
Machine translation of JP-2007-001822 published Jan. 11, 2007.
International Search Report of PCT/JP2008/054951 mailed Jun. 17, 2008.
English language abstract of JP-2002-348129 published Dec. 4, 2002.
English language abstract of JP-2001-302260 published Oct. 31, 2001.
English language abstract of JP-2003-073134 published Mar. 12, 2003.
English language abstract of JP-2006-290700 published Oct. 26, 2006.
English language abstract of CN-1847178 published Oct. 18, 2006.
English language abstract of JP-2004-059368 published Feb. 26, 2004.
English language abstract of JP-2003-048723 published Feb. 21, 2003.
English language abstract of JP-08-143320 published Jun. 4, 1996.
English language abstract of JP-2002-029772 published Jan. 29, 2002.
Machine translation of JP-2002-318129 published Dec. 4, 2002.
Machine translation of JP-2001-302260 published Oct. 31, 2001.
Machine translation of JP-2003-073134 published Mar. 12, 2003.
Machine translation of JP-2006-290700 published Oct. 26, 2006.
Machine translation of JP-2004-059368 published Feb. 26, 2004.
Machine translation of JP-2003-048723 published Feb. 21, 2003.
Machine translation of JP-08-143320 published Jun. 4, 1996.
Machine translation of JP-2002-029772 published Jan. 29, 2002.
English Language Abstract of JP 2002-060239 published Feb. 26, 2006.
English Language Translation of JP 2002-060239 published Feb. 26, 2002.
International Search Report PCT/JP06/309478 mailed Aug. 8, 2006.
Machine Translation of WO 2006-137225 published Dec. 28, 2006.
English Abstract of JP 2002 060239 published Feb. 26, 2002.
International Preliminary Report of Patentability issued in PCT/JP2008/054951 on Oct. 22, 2009.
English Abstract of JP 07-053233 published Feb. 1995.
English Language Translation of JP 07-053233 published Feb. 1995.
U.S. Appl. No. 12/482,497.
U.S. Appl. No. 12/565,789.
U.S. Appl. No. 12/473,360.

U.S. Appl. No.12/565,789.
Chinese Office Action mailed Jul. 28, 2011 in CN Application 096148054.
English Translation of Chinese Office Action mailed Jul. 28, 2011 in CN Application 096145054.
English Language Abstract of CN 1149322 published May 7, 1997.
U.S. Appl. No. 12/480,497 between Jan. 26, 2012 and Feb. 26, 2012 electroniclly captured on Feb. 29, 2012.
Japanese Office Action issued in JP 2007-322478 on Nov. 29, 2011.
English Language Translation of Japanese Office Action issued in JP 2007-322478 on Nov. 29, 2011.
English Language Abstract of JP 2003-277078 published on Oct. 2, 2003.
English Language Translation of JP 2003-277078 published on Oct. 2, 2003.
English Language Abstract of JP 56-005956 published on Jan. 22, 1981.
English Language Abstract of JP 2005-336553 published on Dec. 8, 2005.
English Language Translation of JP 2005-336553 published on Dec. 8, 2005.
English Language Abstract of JP 2004-211132 published on Jul. 29, 2004.
English Language Translation of JP 2004-211132 published on Jul. 29, 2004.
English Language Abstract of JP 01-129929 published on May 23, 1989
English Language Abstract of JP 64-056826 published Mar. 3, 1989.
English Language Abstract of JP 09-020982 published Jan. 21, 1997
English Language Translation of JP 09-020982 published Jan. 21, 1997.
English Language Abstract of JP 11-268921 published on Oct. 5, 1999.
English Language Translation of JP 11-268921 published on Oct. 5, 1999.
English Language Abstract of JP 10-8198 published Jan. 1, 1998.
Machine English Language Translation of JP 10-8198 published Jan. 1, 1998.
U.S. Appl. No. 12/482,497 electronically captured on Oct. 7, 2010.
U.S. Appl. No. 12/565,789 electronically captured on Oct. 7, 2010.
U.S. Appl. No. 12/473,360 electronically captured on Oct. 7, 2010.
English Abstract of JP 03-90539 published Apr. 16, 1991.
English Abstract of JP 10-500735 published Jan. 20, 1998.
English Abstract of JP 56-141922 published Nov. 5, 1981.
Machine English language translation of JP-2002-348129 published Dec. 4, 2009.
English Abstract of JP 11-225783 published Aug. 24, 1999.
English Language Translation of JP 11-225783 published Aug. 24, 1999.
German Office Action issued in DE Appl 112007003040.2-45 on Aug. 16, 2010.
English Translation of German Office Action issued in DE Appl 112007003040.2-45 on Aug. 16, 2010.
U.S. Appl. No. 12/482,497 electronically captured from Oct. 8, 2010 to Nov. 16, 2010.

* cited by examiner

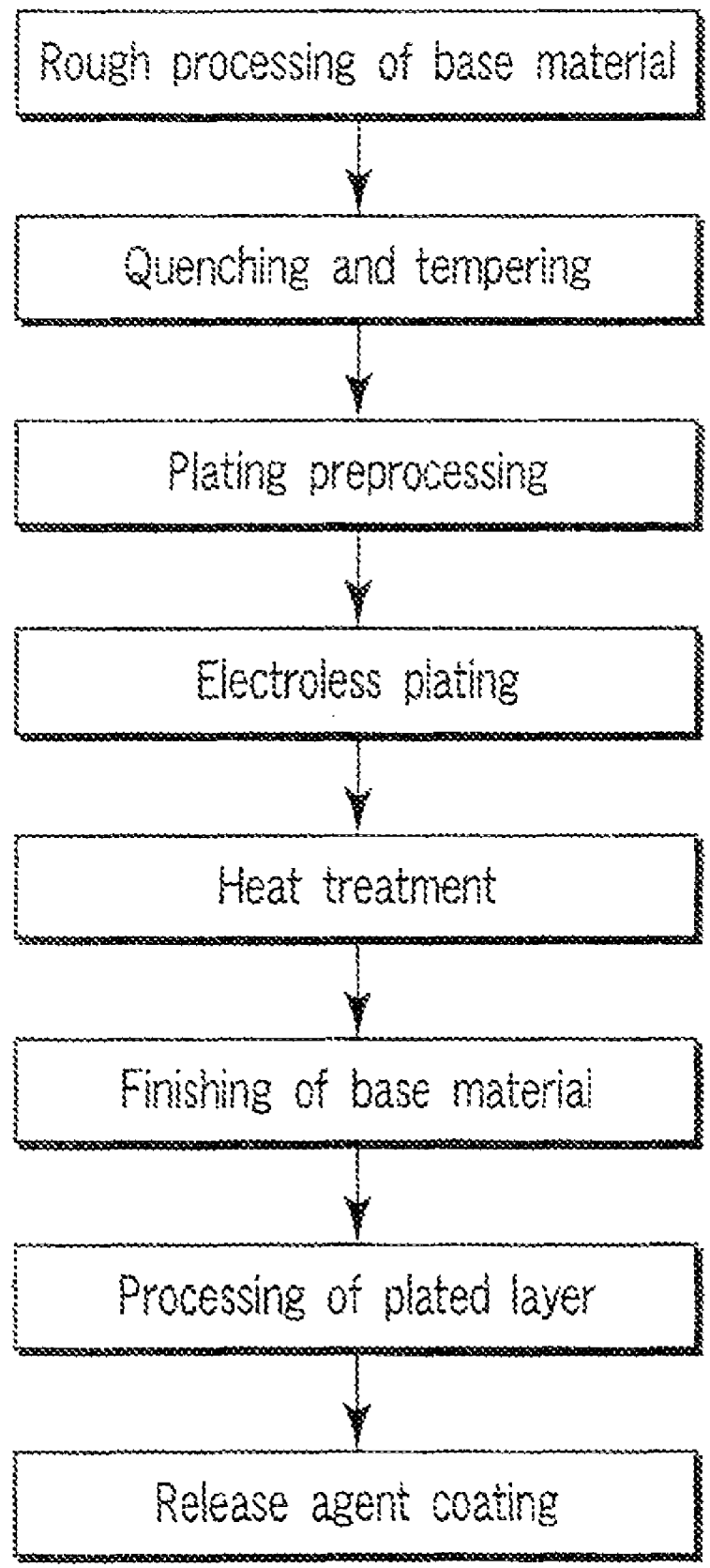

DIE FOR PRESS FORMING OF GLASS AND MANUFACTURING METHOD THEREOF

This application is a U.S. National Stage Application of International Application No PCT/JP2006/309478 filed May 11, 2006. PCT/JP2006/309478 Application claims priority from Japanese Patent Application No. 2005-185052 filed Jun. 24, 2005.

TECHNICAL FIELD

The present invention relates to a die for press forming of glass in which precision processing is required, and a manufacturing method thereof.

BACKGROUND ART

In the field of plastic molding, precision processing technology for molding dies has been established, and the mass production of optical elements having minute shapes such as a diffraction grating has been achieved. In this case, a die is manufactured in the following manner: the surface of a base material made of stainless steel is subjected to electroless Ni—P plating, and this plated layer is then precisely processed by a diamond turning tool.

However, if similar dies are applied to press forming of glass, there arises a problem that cracks are caused in the electroless Ni—P plated layer. This phenomenon results from a press forming temperature. That is, the Ni—P plated layer assumes an amorphous structure in a plated state, but starts crystallization when heated to about 270° C. or more. At this point, a volumetric shrinkage is caused in the plated layer, and tensile stress is produced so that the cracks are caused in the plated layer.

As countermeasures against this problem, in Jpn. Pat. Appln. KOKAI Publication No. 11-157852, a base material having a thermal expansion coefficient of $10\times10^{-6}$ to $16\times10^{-6}$ ($K^{-1}$) is selected, and a heat treatment is carried out at 400 to 500° C. after plating. However, even if the thermal expansion coefficient of the base material is adapted to that of the Ni—P plated layer, a volumetric shrinkage resulting from the crystallization is caused only in the plated layer during the heat treatment, so that the high tensile stress may be produced in the plated layer leading to cracks.

DISCLOSURE OF INVENTION

The present invention has been made in view of the problems associated with surface covering layers of conventional dies for press forming of glass as described above. It is an object of the present invention to provide a method for manufacturing a die in which cracks are not easily caused in the surface covering layer at a press forming temperature of glass.

According to the invention, the method for manufacturing a die for press forming of glass is characterized by comprising:

quenching and tempering a steel material to produce a base material having a structure in which ε-carbide is dispersed in martensite matrix;

coating a surface covering layer made of an amorphous Ni—P alloy on the surface of the base material; and heating the base material and the surface covering layer to change the base material into a troostitic structure or a sorbitic structure and change the surface covering layer into a eutectic structure of Ni and $Ni_3P$.

According to the method of the present invention, in the step of coating the surface covering layer on the surface of the base material and then heating them to crystallize the surface covering layer, the shrinkage of the base material and the shrinkage of the surface covering layer occur with about the same timing, so that nigh tensile stress is not produced in the surface covering layer. Thus, cracks are not easily caused in the surface covering layer.

Preferably, the base material contains carbon in an amount of 0.3 wt % or more and 2.7 wt % or less, and chromium in an amount of 13 wt % or less.

The tempering temperature of the base material is, for example, 350° C. or less.

Preferably, the surface covering layer made of the amorphous Ni—P alloy is formed from electroless plating containing Ni and P or containing Ni, P and B, and the heat treatment is carried out at a temperature higher than the tempering temperature of the base material and higher than a working temperature (e.g., 400° C.) of the die.

In that case, the temperature of the heat treatment is preferably 270° C. or more.

It is to be noted that the steel material can only be quenched and can omit, tempering in the method described above. In that case, the base material has a martensitic structure.

According to the manufacturing method for the present invention, the remaining stress of the surface covering layer can be within a range of +150 MPa to −760 MPa (wherein + indicates tensile stress and − indicates compressive stress). It is to be noted that the remaining stress can be measured by use of, for example, an X-ray stress measuring method.

According to the method for manufacturing the die for press forming of glass of the present invention, cracks are not easily caused in the surface covering layer of the die, thereby making it possible to maintain the shape of the die with high accuracy and increasing its life.

BRIEF DESCRIPTION OF DRAWINGS

The single FIGURE is a chart showing the outline of steps of manufacturing a die for press forming of glass according to the present invention.

BEST MODE FOR CARRYING OUT THE INVENTION

FIG. 1 shows the outline of steps of manufacturing a die for press forming of glass according to the present invention.

A base material made of carbon steel or low alloy steel is roughly processed, and then quenched and tempered. Subsequently, the base material is subjected to plating preprocessing, and a surface covering layer made of an Ni—P alloy is formed by electroless plating. Subsequently, the base material and the surface covering layer are heated, so that the surface covering layer is crystallized and the base material is changed into a tempered structure. Subsequently, the base material and the surface covering layer are finished, and then the surface covering layer is coated with a release agent.

It is to be noted that, as a modified form of the steps described above, the base material and the surface covering layer can be heated after the surface covering layer is finished.

According to the manufacturing method for the present invention, in the step of the heat treatment for crystallizing the surface covering layer, the dimensional change of the base material of the die is brought closer to the dimensional change of the surface covering layer, thereby holding down tensile stress produced in the surface covering layer. An amorphous Ni—P alloy layer formed on the surface of the die by electroless plating changes into a eutectic structure of Ni and $Ni_3P$ and shrinks its volume when the die is heated to the press forming temperature of glass. Such a shrinkage starts at about 270° C. On the other hand, a carbon steel having a martensitic structure also shrinks its volume along with the change of the structure in the step of tempering.

Table 1 shows how the structure and dimension change in the process of tempering the carbon steel having the martensitic structure. As shown in Table 1, while carbon steel is being heated from about 270° C. to about 430° C., cementite separates from low carbon martensite, so that the structure of the host material changes to ferrite, and the volume thereof shrinks accordingly.

TABLE 1

Changes of structure and length due to tempering of carbon steel

| | Temperature range | Structural change | Dimensional change |
|---|---|---|---|
| First step | 100 to 200° C. | Martensite → low carbon martensite + ε-carbide | Shrinkage |
| Second step | 230 to 270° C. | Retained austenite → bainite | Expansion |
| Third step | 270 to 430° C. | Low carbon martensite → ferrite + cementite ε-carbide → cementite | Shrinkage |

In the manufacturing method for the present invention, since the volumetric shrinkage in the step of tempering carbon steel is thus utilized, the tempering temperature of the base material of the die before plating needs to be set much lower than the temperature of the heat treatment of the die after plating. Here, the temperature of the heat treatment after plating needs to be 270° C. or more at which the amorphous Ni—P alloy layer starts to change into the eutectic structure.

Further, the temperature of the heat treatment needs to be equal to or more than the working temperature (e.g., the press forming temperature of glass) of the die. The reason is that if the temperature of the heat treatment is lower than the working temperature of the die, a dimensional change is caused in use, and the dimensional accuracy of products decreases. The upper limit of the temperature of the heat treatment is desirably the working temperature plus about 30° C. If the temperature of the heat treatment is unnecessarily high, there emerges adverse effects such as the softening of the base material.

On the other hand, the tempering temperature of the base material of the die before plating needs to be 350° C. or more. Thus, during the heat treatment after plating, the structural change in the third step (Table 1) is caused in the base material of the die, and the volumetric shrinkage thereof occurs with about the same timing as that of the Ni—P alloy layer. On the contrary, when the tempering temperature of the base material is higher than 350° C., the volumetric shrinkage of the base material in a range of 270° C. to 430° C. (third stags in Table 1) is not sufficient during the heat treatment after plating, and cracks might be caused in the Ni—P alloy layer.

It is to be noted that the die before plated can only be quenched and can omit tempering.

As the composition of the base material, the content of C is desirably 0.3 wt % or more and 2.7 wt % or less. If the content of C is lower than 0.3 wt %, the amount of the volumetric shrinkage of the base material in the third step (Table 1) of tempering is too small. On the other hand, if the content of C is beyond 0.3 wt %, the amount of the volumetric shrinkage of the base material is sufficient, but there emerge harmful effects such as a decrease in tenacity.

Furthermore, the content of Cr is desirably 13 wt % or less. If the content of Cr is beyond 13 wt %, the decomposition of the retained austenite in the second step of tempering occurs at 500° C. or more, and the difference of the volumetric shrinkage between the base material and the Ni—P alloy layer becomes greater. It is to be noted that there is no specific limitation of the lower limit of the content of Cr.

The structure of the base material before the heat treatment needs to be a martensitic structure (or low carbon martensite+ ε-carbide). When this martensite is decomposed into ferrite and cementite, a great volumetric shrinkage occurs. The base material after the heat treatment has a troostitic structure (a structure in which ferrite and cementite are extremely finely mixed) or a sorbitic structure (a mixed structure of ferrite and cementite in which cementite has separated and grown into granular shapes). The structure of an Ni—P or Ni—P—B plated layer is amorphous or partly amorphous in a plated state, and is metamorphosed into a completely crystallized mixed structure of Ni and $Ni_3P$ by heating at about 270° C. or more. Metallographic characteristics described above are arranged in Table 2.

TABLE 2

Structure of base material and surface layer before and after heat treatment

| | Before heat treatment | After heat treatment |
|---|---|---|
| Base material | Martensite Martensite + ε-carbide | Troostite Sorbite |
| Surface layer | Amorphous Ni | Crystalline Ni + $Ni_3P$ |

Dies were manufactured in which base materials having various compositions were covered with electroless Ni—P plating at a thickness of 100 μm. These dies were inspected for the number of cracks caused during heat treatments and during press forming. The relation between the composition of the base material, the tempering temperature and the heat treatment temperature, and the incidence of cracks is shown in Table 3. The press forming temperature of glass is set at 430° C. for all cases. It is to be noted that, in this table, specimens 13 to 15 are dies for plastic molding used for comparison. As can be understood from Table 3, the occurrence of cracks was not recognized in the dies manufactured according to the manufacturing method for the present invention.

TABLE 3

Relation between tempering temperature and heat treatment temperature, and incidence of cracks

| Base material | C content | Cr content | tempering temp. | Heat treatment temp. | Incidence of cracks |
|---|---|---|---|---|---|
| Specimen 1 | 0.2 | 1.2 | 250° C. | 450° C. | 5/5 |
| Specimen 2 | 0.2 | 6.6 | 250° C. | 450° C. | 5/5 |
| Specimen 3 | 0.3 | 14.1 | 250° C. | 450° C. | 5/5 |
| Specimen 4 | 0.7 | 0.9 | 250° C. | 450° C. | 0/5 |
| Specimen 5 | 0.6 | 7.4 | 250° C. | 450° C. | 0/5 |
| Specimen 6 | 0.6 | 13.8 | 250° C. | 450° C. | 3/5 |
| Specimen 7 | 1.4 | 1.0 | 250° C. | 450° C. | 0/5 |
| Specimen 8 | 1.2 | 5.9 | 250° C. | 450° C. | 0/5 |
| Specimen 9 | 1.3 | 13.5 | 250° C. | 450° C. | 1/5 |
| Specimen 10 | 2.7 | 1.1 | 250° C. | 450° C. | 0/5 |
| Specimen 11 | 2.6 | 6.3 | 250° C. | 450° C. | 0/5 |
| Specimen 12 | 2.7 | 14.2 | 250° C. | 450° C. | 4/5 |

TABLE 3-continued

Relation between tempering temperature and heat treatment temperature, and incidence of cracks

| Base material | C content | Cr content | tempering temp. | Heat treatment temp. | Incidence of cracks |
|---|---|---|---|---|---|
| Specimen 13 | 0.4 | 14.0 | 520° C. | 450° C. | 5/5 |
| Specimen 14 | 0.4 | 14.0 | 450° C. | 450° C. | 5/5 |
| Specimen 15 | 0.4 | 14.0 | 250° C. | 450° C. | 5/5 |

The invention claimed is:

1. A method for manufacturing a die for press forming of glass, comprising:
 quenching and tempering a steel material to produce a base material of the die having a structure in which ϵ-carbide is dispersed in martensite matrix, the steel material containing carbon in an amount of 0.3 wt % or more and 2.7 wt % or less, and chromium in an amount of 13 wt % or less;
 coating a surface covering layer made of an amorphous Ni—P alloy on the surface of the base material; and
 heating the base material and the surface covering layer to change the base material into a troostitic structure or a sorbitic structure and crystallize the surface covering layer into a eutectic structure of Ni and $Ni_3P$, the heating being carried out at a temperature higher than 270° C. and lower than 460° C. to form the die.

2. The method for manufacturing a die for press forming of glass according to claim 1, wherein a tempering temperature of the steel material is 350° C. or less.

3. The method for manufacturing a die for press forming of glass according to claim 1, wherein
 the surface covering layer made of the amorphous Ni—P alloy is formed from electroless plating containing Ni and P or containing Ni, P and B, and the heating is carried out at a temperature higher than the tempering temperature of the base material.

4. A method for manufacturing a die for press forming of glass, comprising:
 quenching a steel material to produce a base material of the die having a martensitic structure, the steel material containing carbon in an amount of 0.3 wt % or more and 2.7 wt % or less, and chromium in an amount of 13 wt % or less;
 coating a surface covering layer made of an amorphous Ni—P alloy on the surface of the base material; and
 heating the base material and the surface covering layer to change the base material into a troostitic structure or a sorbitic structure and crystallize the surface covering layer into a eutectic structure of Ni and $Ni_3P$, the heating being carried out at a temperature higher than 270° C. and lower than 460° C. to form the die.

5. The method for manufacturing a die for press forming of glass according to claim 4, wherein
 the surface covering layer made of the amorphous Ni—P alloy is formed from electroless plating containing Ni and P or containing Ni, P and B.

6. The method for manufacturing a die for press forming of glass according to claim 1, wherein the heating is carried out at a temperature higher than 400° C. and lower than 460° C.

7. The method for manufacturing a die for press forming of glass according to claim 4, wherein the heating is carried out at a temperature higher than 400° C. and lower than 460° C.

8. A method for manufacturing a die for press forming of glass, comprising:
 quenching a steel material to produce a base material of the die having a martensitic structure, the steel material containing carbon in an amount of 0.3 wt % or more and 2.7 wt % or less, and chromium in an amount of 13 wt % or less;
 coating a surface covering layer made of an amorphous Ni—P alloy on the surface of the base material;
 heating the base material and the surface covering layer to change the base material into a troostitic structure or a sorbitic structure and crystallize the surface covering layer into a eutectic structure of Ni and $Ni_3P$, the heating being carried out at a temperature higher than 270° C. and lower than 460° C.; and
 coating the surface covering layer with a release agent subsequent to the heating;
 wherein the die is constructed and configured to press form glass into products.

9. A method for manufacturing and using a die for press forming of glass, comprising:
 quenching and tempering a steel material to produce a base material of the die having a structure in which ϵ-carbide is dispersed in martensite matrix, the steel material containing carbon in an amount of 0.3 wt % or more and 2.7 wt % or less, and chromium in an amount of 13 wt % or less;
 coating a surface covering layer made of an amorphous Ni—P alloy on the surface of the base material; and
 heating the base material and the surface covering layer to change the base material into a troostitic structure or a sorbitic structure and crystallize the surface covering layer into a eutectic structure of Ni and $Ni_3P$, the heating being carried out at a temperature higher than 270° C. and lower than 460° C. to form the die;
 coating the surface covering layer with a release agent subsequent to the heating; and
 press forming glass at the press forming temperature with the die.

* * * * *

UNITED STATES PATENT AND TRADEMARK OFFICE
CERTIFICATE OF CORRECTION

PATENT NO. : 8,206,518 B2  Page 1 of 1
APPLICATION NO. : 11/573501
DATED : June 26, 2012
INVENTOR(S) : Jun Masuda It is certified that error appears in the above-identified patent and that said Letters Patent is hereby corrected as shown below:

TITLE PAGE,
Item [73], Assignee, replace "Kakai" with "Kikai"

Signed and Sealed this
Sixteenth Day of October, 2012

David J. Kappos
*Director of the United States Patent and Trademark Office*